(12) United States Patent
Guy et al.

(10) Patent No.: US 8,980,392 B2
(45) Date of Patent: Mar. 17, 2015

(54) USE OF A SPECIFIC FUNCTIONALISED ORGANOSILICON COMPOUND AS A COUPLING AGENT IN AN ISOPRENE ELASTOMER COMPOSITION INCLUDING A REINFORCING INORGANIC FILLER

(75) Inventors: Laurent Guy, Rillieux la Pape (FR); Virginie Pevere, Lyons (FR); Thierry Vidal, Lyons (FR)

(73) Assignee: Rhodia Operations, Aubervilliers (FR)

( * ) Notice: Subject to any disclaimer, the term of this patent is extended or adjusted under 35 U.S.C. 154(b) by 440 days.

(21) Appl. No.: 13/376,003

(22) PCT Filed: Jun. 2, 2010

(86) PCT No.: PCT/EP2010/057739
§ 371 (c)(1),
(2), (4) Date: May 21, 2012

(87) PCT Pub. No.: WO2010/139743
PCT Pub. Date: Dec. 9, 2010

(65) Prior Publication Data
US 2012/0225233 A1    Sep. 6, 2012

(30) Foreign Application Priority Data

Jun. 2, 2009 (FR) ...................... 09 02646

(51) Int. Cl.
| | | |
|---|---|---|
| C08L 9/00 | (2006.01) | |
| C08K 9/12 | (2006.01) | |
| C08J 3/20 | (2006.01) | |
| C08K 3/36 | (2006.01) | |
| C08K 5/5425 | (2006.01) | |
| C08K 5/544 | (2006.01) | |

(52) U.S. Cl.
CPC ............... C08K 5/5425 (2013.01); C08K 3/36 (2013.01); C08K 5/544 (2013.01); C08L 9/00 (2013.01); *Y10T 428/139* (2015.01)
USPC .......... 428/36.9; 525/102; 525/105; 525/288; 525/281; 525/279; 525/284; 524/571

(58) Field of Classification Search
USPC ......... 428/36.9; 525/102, 105, 288, 281, 279, 525/284; 524/571
See application file for complete search history.

(56) References Cited

U.S. PATENT DOCUMENTS

| | | |
|---|---|---|
| 4,820,751 A | 4/1989 | Takeshita et al. |
| 6,359,034 B1 | 3/2002 | Visel et al. |
| 6,518,350 B1 | 2/2003 | Kobayashi et al. |
| 2003/0221760 A1 | 12/2003 | Grimberg et al. |
| 2008/0319151 A1 | 12/2008 | Oshima |

FOREIGN PATENT DOCUMENTS

| | | | |
|---|---|---|---|
| EP | 1 072 442 A1 | 1/2001 | |
| EP | 1 132 423 A1 * | 9/2001 | ............... C08K 3/36 |
| WO | WO 02/10265 A1 | 2/2002 | |

OTHER PUBLICATIONS

International Search Report (PCT/ISA/210) issued on Aug. 31, 2010, by European Patent Office as the International Searching Authority for International Application No. PCT/EP2010/057739.
Written Opinion (PCT/ISA/237) issued on Aug. 31, 2010, by European Patent Office as the International Searching Authority for International Application No. PCT/EP2010/057739.

* cited by examiner

*Primary Examiner* — Robert D. Harlan
(74) *Attorney, Agent, or Firm* — Dentons US LLP

(57) ABSTRACT

The use of a functionalized organosilicon compound as a coupling agent between an inorganic filler and an elastomer in an elastomer composition including an isoprene elastomer and a reinforcing inorganic filler is disclosed. The compound is selected among functionalized organosilicon compounds including at least one double bond C═C or C═N, and not including any C═C—C═O bonds or N═N bonds, and reacting with the isoprene units according to an electrocyclic reaction, in particular according to a standard cycloaddition reaction [2+1], [2+2], [3+2] or a Diels-Alder reaction [4+2] or an ene-synthesis reaction other than an ene-synthesis reaction between an isoprene unit and a C═C—C═O or N═N function. Also described, are elastomer composition(s) obtained and items manufactured using such compositions.

44 Claims, No Drawings

USE OF A SPECIFIC FUNCTIONALISED ORGANOSILICON COMPOUND AS A COUPLING AGENT IN AN ISOPRENE ELASTOMER COMPOSITION INCLUDING A REINFORCING INORGANIC FILLER

This application is the United States national phase of PCT/EP2010/057739, filed Jun. 2, 2010, and designating the United States (published in the French language on Dec. 9, 2010, as WO 2010/139743A1; the title and abstract were also published in English), which claims priority under 35 U.S.C. 119 of FR 0902646, filed Jun. 2, 2009, each hereby expressly incorporated by reference in its entirety and each assigned to the assignee hereof.

The invention relates to the use of particular organosilicon compounds (silanes) as inorganic filler-elastomer coupling agents in elastomer compositions comprising an isoprene elastomer, such as natural rubber, and an inorganic filler as reinforcing filler, such as a precipitated silica, notably highly dispersible.

It also relates to the corresponding elastomer compositions and to articles, notably tires, comprising said compositions.

It is known that articles made of elastomer(s) are generally subject to varied stresses, for example such as a variation of temperature, a high-frequency variation of loading in dynamic conditions, high static stress and/or non-negligible flexural fatigue in dynamic conditions. Such articles are for example tires, shoe soles, floor coverings, conveyor belts, belts for power transmission, hoses, seals, notably seals of household electrical appliances, mountings performing the role of extracting engine vibrations either with metal reinforcement, or with a hydraulic fluid within the elastomer, cable sheaths, cables, cableway rollers.

There have been proposals to use notably elastomer compositions reinforced with specific inorganic fillers described as "reinforcing", preferably having high dispersibility. These fillers, and especially white fillers such as precipitated silicas, can compete with or even surpass, at least from the standpoint of use as reinforcement, the carbon black used conventionally, and in addition offer these compositions generally lower hysteresis, which is synonymous notably with reduced internal heating of articles made of elastomer(s) during use.

It is known by a person skilled in the art that it is generally necessary to use, in elastomer compositions containing said reinforcing fillers, a coupling agent, also called bonding agent, which notably has the function of ensuring connection between the surface of the particles of inorganic filler (preferably a precipitated silica, in particular highly dispersible) and the elastomer(s), while facilitating dispersion of said inorganic filler within the elastomer matrix.

As is known, inorganic filler-elastomer coupling agent means an agent that is able to establish a sufficient connection, of a chemical and/or physical nature, between the inorganic filler and the elastomer.

Such a coupling agent, which is at least bifunctional, has for example the simplified general formula "N-V-M", in which:

N represents a functional group (function "N") capable of binding physically and/or chemically to the inorganic filler, and said bond can be established, for example, between a silicon atom of the coupling agent and the hydroxyl groups (OH) of the surface of the inorganic filler (for example surface silanols when it is silica);

M represents a functional group (function "M") capable of binding physically and/or chemically to the elastomer, notably via an atom or of a group of suitable atoms (for example a sulfur atom);

V represents a group (divalent/hydrocarbon) making it possible to join "N" and "M" together.

The coupling agents must not be confused with simple agents for covering inorganic filler which, as is known, can have the function "N" that is active with respect to the inorganic filler but lack the function "M" that is active with respect to the elastomer.

Coupling agents, notably (silica-elastomer), have been described in many documents of the prior art, the best known being (poly)sulfide silanes, in particular (poly)sulfide alkoxysilanes. Among these (poly)sulfide silanes, we may notably mention bis-triethoxysilylpropyl tetrasulfide (abbreviated to TESPT), which is generally still regarded today as a product providing, for vulcanizates comprising an inorganic filler as reinforcing filler, such as silica, a very good, or even the best, compromise in terms of scorch safety, ease of use and reinforcing capacity.

The combined use of precipitated silica, in particular highly dispersible, and of a polysulfide silane (or functionalized organosilicon compound) in a composition of modified elastomer(s) has allowed the development of a "green tire" for private cars (light vehicles). This combination has made it possible to achieve performance in terms of wear resistance comparable to that of elastomer compounds reinforced with carbon black, while significantly improving the rolling resistance (hence a decrease in fuel consumption), and adherence on wet surfaces.

It would therefore be advantageous also to be able to use an inorganic filler such as silica in tires for heavy goods vehicles, said tires being obtained from compositions based on isoprene elastomer(s), principally natural rubber.

However, the same silica/polysulfide silane combination applied to an isoprene elastomer such as natural rubber has not provided a sufficient level of reinforcement (which can be illustrated by a stress-elongation curve in uniaxial tension) relative to what is obtained when carbon black is used as filler, and this decline in reinforcement leads to mediocre wear resistance.

The aim of the present invention is notably to propose coupling agents, comprising an alternative to the known coupling agents, for elastomer compositions comprising an isoprene elastomer, such as natural rubber, and a reinforcing inorganic filler, in particular a white filler such as precipitated silica, preferably highly dispersible, said coupling agents moreover providing them with a very satisfactory compromise of properties, in particular with respect to their rheological, mechanical and/or dynamic, notably hysteresis, properties. Advantageously, they provide an improvement of the hysteresis/reinforcement compromise.

The first object of the invention relates to, the use as inorganic filler-elastomer coupling agent, in a composition of elastomer(s) comprising (variant 1):

at least one isoprene elastomer, at least one inorganic filler as reinforcing filler, of at least one functionalized organosilicon compound (or silane), characterized in that said compound is selected from functionalized organosilicon compounds having at least one $C=C$ or $C=N$ double bond and reacting with the isoprene units according to a reaction of the electrocyclization type.

"Reaction of the electrocyclization type" means a molecular rearrangement in which a covalent single bond is formed between two double bonds (notably reorganization of the orbitals without formation of free radicals), leading to a cyclic compound comprising a double bond.

The invention also relates, in its first object, to the use as inorganic filler-elastomer coupling agent, in a composition of elastomer(s) comprising (variant 2, or preferred variant of variant 1):

at least one isoprene elastomer, at least one inorganic filler as reinforcing filler, of at least one functionalized organosilicon compound (or silane), characterized in that said compound is selected from functionalized organosilicon compounds having at least one C=C or C=N double bond and reacting with the isoprene units according to a cycloaddition reaction of type [2+1], [2+2], [3+2] or Diels-Alder [4+2] or a reaction of ene synthesis different from a reaction of ene synthesis between an isoprene unit and a C=C—C=O or N=N function; very preferably, said functionalized organosilicon compound is such that it reacts with the isoprene units according to a cycloaddition reaction of Diels-Alder [4+2] type or a reaction of ene synthesis different from a reaction of ene synthesis between an isoprene unit and a C=C—C=O or N=N function.

The functionalized organosilicon compound (silane) employed advantageously does not possess an activated ethylenic double bond selected from the following functions: maleamic acid, acrylamide, acrylic, isomaleimide, maleimide, maleic acid, maleic ester, maleic amide, fumaric acid, fumaric ester, fumaramic acid, fumaramic ester, fumaric amide.

The functionalized organosilicon compound used advantageously does not have a C=C—C=O bond.

It does not have an N=N bond.

The invention relates in its second object to the use as inorganic filler-elastomer coupling agent, in a composition of elastomer(s) comprising:

at least one isoprene elastomer, at least one inorganic filler as reinforcing filler, of at least one functionalized organosilicon compound (silane), characterized in that said compound corresponds to one of the formulae (I), (II), (III), (IV), (V), (VI) and (VII) given below (in which C represents a carbon atom).

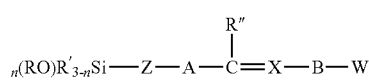

Formula (I)

in which:

n is an integer equal to 1, 2 or 3 (n applies to (RO) and 3-n to R');

R represents a hydrogen atom H, or, preferably, an alkyl radical, in particular linear, branched, cyclic or aromatic (generally a linear or branched alkyl radical), notably of $C_1$-$C_8$ (for example methyl, ethyl, n-propyl, isopropyl, n-butyl, isobutyl), or an alkaryl radical (notably $C_1$-$C_8$ alkyl, $C_6$-$C_{18}$ aryl);

R' represents an alkyl radical, in particular linear, branched, cyclic or aromatic, optionally bearing at least one heteroatom (for example S, preferably N or O), generally a linear or branched alkyl radical, notably of $C_1$-$C_8$ (for example methyl, ethyl, n-propyl, isopropyl, n-butyl, isobutyl), or an alkaryl radical (notably $C_1$-$C_8$ alkyl, $C_6$-$C_{18}$ aryl);

Z represents a (divalent) radical selected from: a saturated or unsaturated aliphatic hydrocarbon group; a saturated, unsaturated and/or aromatic, monocyclic or polycyclic, carbocyclic group, bearing or not bearing at least one heteroatom (for example S, preferably N or O); a group having a saturated or unsaturated aliphatic hydrocarbon moiety and a carbocyclic moiety as defined above; said radical optionally being substituted or interrupted by a sulfur atom and/or, preferably, an oxygen atom and/or a nitrogen atom, said nitrogen atom bearing a monovalent group selected from a hydrogen atom, a saturated or unsaturated aliphatic hydrocarbon group, a saturated or unsaturated and/or aromatic, monocyclic or polycyclic, carbocyclic group bearing or not bearing at least one heteroatom (for example S, preferably N or O) and a group having a saturated or unsaturated aliphatic hydrocarbon moiety; in general, Z represents an alkyl chain, in particular linear or branched, notably of $C_1$-$C_{12}$ (for example methyl, ethyl, n-propyl, isopropyl, n-butyl, isobutyl), or alkylidene, optionally bearing at least one heteroatom (for example S, preferably N or O) or an aromatic moiety, notably of $C_6$-$C_{18}$, optionally bearing at least one heteroatom (for example S, preferably N or O), for example phenyl, anthracenyl, pyridinyl;

R" represents an alkyl radical, in particular linear, branched, cyclic or aromatic, optionally bearing at least one heteroatom (for example S, preferably N or O), generally a linear or branched alkyl radical, notably of $C_1$-$C_8$ (for example methyl, ethyl, n-propyl, isopropyl, n-butyl, isobutyl), or, preferably, a hydrogen atom H;

X represents a radical selected from N, CH and CR";

A represents an alkyl radical, in particular linear or branched, notably of $C_1$-$C_8$ (for example methyl, ethyl, n-propyl, isopropyl, n-butyl, isobutyl), or alkaryl (notably $C_1$-$C_8$ alkyl, $C_6$-$C_{18}$ aryl), optionally bearing at least one heteroatom (for example S, preferably N or O);

B represents a hydrogen atom or an alkyl radical, in particular linear or branched, notably of $C_1$-$C_8$ (for example methyl, ethyl, n-propyl, isopropyl, n-butyl, isobutyl), or alkaryl (notably $C_1$-$C_8$ alkyl, $C_6$-$C_{18}$ aryl), optionally bearing at least one heteroatom (for example S, preferably N or O), B preferably being identical to A;

the radical —W is optional (preferred variant) or contains (in particular consists of) the formula —Z—SiR'$_{3-n}$(OR)$_n$.

As preferred examples of compounds of formula (I) employed according to the invention, we may mention the following compounds of formula (Ia), (Ib), (Ic), (Id):

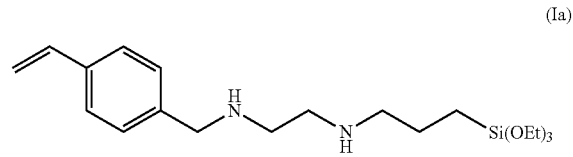

(Ia)

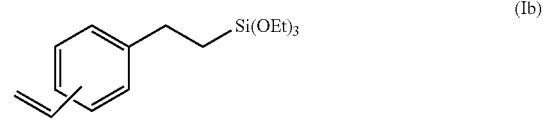

(Ib)

(Ic)

(Id)

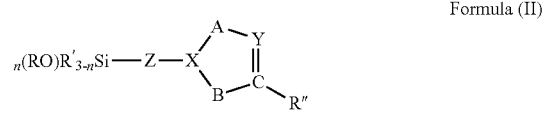

Formula (II)

in which:

n is an integer equal to 1, 2 or 3 (n applies to (RO) and 3-n to R');

R represents a hydrogen atom H, or, preferably, an alkyl radical, in particular linear, branched, cyclic or aromatic (generally a linear or branched alkyl radical), notably of $C_1$-$C_8$ (for example methyl, ethyl, n-propyl, isopropyl, n-butyl, isobutyl), or an alkaryl radical (notably $C_1$-$C_8$ alkyl, $C_6$-$C_{18}$ aryl);

R' represents an alkyl radical, in particular linear, branched, cyclic or aromatic, optionally bearing at least one heteroatom (for example S, preferably N or O), generally a linear or branched alkyl radical, notably of $C_1$-$C_8$ (for example methyl, ethyl, n-propyl, isopropyl, n-butyl, isobutyl), or an alkaryl radical (notably $C_1$-$C_8$ alkyl, $C_6$-$C_{18}$ aryl);

Z represents a (divalent) radical selected from: a saturated or unsaturated aliphatic hydrocarbon group; a saturated, unsaturated and/or aromatic, monocyclic or polycyclic, carbocyclic group, bearing or not bearing at least one heteroatom (for example S, preferably N or O); a group having a saturated or unsaturated aliphatic hydrocarbon moiety and a carbocyclic moiety as defined above; said radical optionally being substituted or interrupted by a sulfur atom and/or, preferably, an oxygen atom and/or a nitrogen atom, said nitrogen atom bearing a monovalent group selected from a hydrogen atom, a saturated or unsaturated aliphatic hydrocarbon group, a saturated or unsaturated and/or aromatic, monocyclic or polycyclic, carbocyclic group bearing or not bearing at least one heteroatom (for example S, preferably N or O) and a group having a saturated or unsaturated aliphatic hydrocarbon moiety; in general, Z represents an alkyl chain, in particular linear or branched, notably of $C_1$-$C_{12}$ (for example methyl, ethyl, n-propyl, isopropyl, n-butyl, isobutyl), or alkylidene, optionally bearing at least one heteroatom (for example S, preferably N or O) or an aromatic moiety, notably of $C_6$-$C_{18}$, optionally bearing at least one heteroatom (for example S, preferably N or O), for example phenyl, anthracenyl, pyridinyl;

R" represents an alkyl radical, in particular linear, branched, cyclic or aromatic, optionally bearing at least one heteroatom (for example S, preferably N or O), generally a linear or branched alkyl radical, notably of $C_1$-$C_8$ (for example methyl, ethyl, n-propyl, isopropyl, n-butyl, isobutyl), or, preferably, a hydrogen atom H;

X represents a radical selected from N, $N^+$, CH and CR", and the bond X—B can be C=C or N=C;

Y represents a radical selected from N, CH and CR";

A and B, which may be different or identical, each represent an alkyl radical, in particular linear or branched, notably of $C_1$-$C_8$ (for example methyl, ethyl, n-propyl, isopropyl, n-butyl, isobutyl), an alkylene radical, notably of $C_1$-$C_8$, or C=O, A and B each being different from C=O when Y is C.

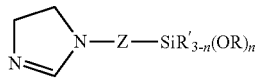

Formula (III)

in which:

n is an integer equal to 1, 2 or 3 (n applies to (RO) and 3-n to R');

R represents a hydrogen atom H, or, preferably, an alkyl radical, in particular linear, branched, cyclic or aromatic (generally a linear or branched alkyl radical), notably of $C_1$-$C_8$ (for example methyl, ethyl, n-propyl, isopropyl, n-butyl, isobutyl), or an alkaryl radical (notably $C_1$-$C_8$ alkyl, $C_6$-$C_{18}$ aryl);

R' represents an alkyl radical, in particular linear, branched, cyclic or aromatic, optionally bearing at least one heteroatom (for example S, preferably N or O), generally a linear or branched alkyl radical, notably of $C_1$-$C_8$ (for example methyl, ethyl, n-propyl, isopropyl, n-butyl, isobutyl), or an alkaryl radical (notably $C_1$-$C_8$ alkyl, $C_6$-$C_{18}$ aryl);

Z represents a (divalent) radical selected from: a saturated or unsaturated aliphatic hydrocarbon group; a saturated, unsaturated and/or aromatic, monocyclic or polycyclic, carbocyclic group, bearing or not bearing at least one heteroatom (for example S, preferably N or O); a group having a saturated or unsaturated aliphatic hydrocarbon moiety and a carbocyclic moiety as defined above; said radical optionally being substituted or interrupted by a sulfur atom and/or, preferably, an oxygen atom and/or a nitrogen atom, said nitrogen atom bearing a monovalent group selected from a hydrogen atom, a saturated or unsaturated aliphatic hydrocarbon group, a saturated or unsaturated and/or aromatic, monocyclic or polycyclic, carbocyclic group bearing or not bearing at least one heteroatom (for example S, preferably N or O) and a group having a saturated or unsaturated aliphatic hydrocarbon moiety; in general, Z represents an alkyl chain, in particular linear or branched, notably of $C_1$-$C_{12}$ (for example methyl, ethyl, n-propyl, isopropyl, n-butyl, isobutyl), or alkylidene, optionally bearing at least one heteroatom (for example S, preferably N or O) or an aromatic moiety, notably of $C_6$-$C_{18}$, optionally bearing at least one heteroatom (for example S, preferably N or O), for example phenyl, anthracenyl, pyridinyl.

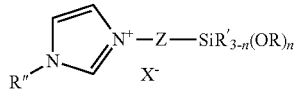

Formula (IV)

in which:

n is an integer equal to 1, 2 or 3 (n applies to (RO) and 3-n to R');

R represents a hydrogen atom H, or, preferably, an alkyl radical, in particular linear, branched, cyclic or aromatic (generally a linear or branched alkyl radical), notably of $C_1$-$C_8$ (for example methyl, ethyl, n-propyl, isopropyl, n-butyl, isobutyl), or an alkaryl radical (notably $C_1$-$C_8$ alkyl, $C_6$-$C_{18}$ aryl);

R' represents an alkyl radical, in particular linear, branched, cyclic or aromatic, optionally bearing at least one heteroatom (for example S, preferably N or O), generally a linear or branched alkyl radical, notably of $C_1$-$C_8$ (for example methyl, ethyl, n-propyl, isopropyl, n-butyl, isobutyl), or an alkaryl radical (notably $C_1$-$C_8$ alkyl, $C_6$-$C_{18}$ aryl);

Z represents a (divalent) radical selected from: a saturated or unsaturated aliphatic hydrocarbon group; a saturated, unsaturated and/or aromatic, monocyclic or polycyclic, carbocyclic group, bearing or not bearing at least one heteroatom (for example S, preferably N or O); a group having a saturated or unsaturated aliphatic hydrocarbon moiety and a carbocyclic moiety as defined above; said radical optionally being substituted or interrupted by a sulfur atom and/or, preferably, an oxygen atom and/or a nitrogen atom, said nitrogen atom bearing a monovalent group selected from a hydrogen atom, a saturated or unsaturated aliphatic hydrocarbon group, a saturated or unsaturated and/or aromatic, monocyclic or polycyclic, carbocyclic group bearing or not bearing at least one heteroatom (for example S, preferably N or O) and a group having a saturated or unsaturated aliphatic hydrocarbon moiety; in general, Z represents an alkyl chain, in particular linear or branched, notably of $C_1$-$C_{12}$ (for example methyl, ethyl, n-propyl, isopropyl, n-butyl, isobutyl), or alkylidene, optionally bearing at least one heteroatom (for example S, preferably N or O) or an aromatic moiety, notably of $C_6$-$C_{18}$, optionally bearing at least one heteroatom (for example S, preferably N or O), for example phenyl, anthracenyl, pyridinyl;

R″ represents an alkyl radical, in particular linear, branched, cyclic or aromatic, generally a linear or branched alkyl radical, notably of $C_1$-$C_8$ (for example methyl, ethyl, n-propyl, isopropyl, n-butyl, isobutyl), or a hydrogen atom H;

X is a halogen atom, in particular Cl.

As preferred examples of compounds of formula (III) and (IV) employed according to the invention, we may mention the following compounds of formula (IIIa) and (IVa):

(IIIa)

N-(3-triethoxysilylpropyl)-4,5-dihydroimidazole (IVa)

Formula (V)

$$n(RO)R'_{3-n}Si-Z-A-\overset{R''}{\underset{|}{C}}=X-\overset{R''}{\underset{|}{C}}=X-B$$

Formula (VI)

$$(RO)_nR'_{3-n}Si-Z-X_1\begin{array}{c}R''\\ \diagup\diagdown\\X_2\\ |\\X_3\\ \diagdown\diagup\\R''\end{array}$$

In formulae (V) and (VI):

n is an integer equal to 1, 2 or 3 (n applies to (RO) and 3-n to R');

R represents a hydrogen atom H, or, preferably, an alkyl radical, in particular linear, branched, cyclic or aromatic (generally a linear or branched alkyl radical), notably of $C_1$-$C_8$ (for example methyl, ethyl, n-propyl, isopropyl, n-butyl, isobutyl), or an alkaryl radical (notably $C_1$-$C_8$ alkyl, $C_6$-$C_{18}$ aryl);

R' represents an alkyl radical, in particular linear, branched, cyclic or aromatic, optionally bearing at least one heteroatom (for example S, preferably N or O), generally a linear or branched alkyl radical, notably of $C_1$-$C_8$ (for example methyl, ethyl, n-propyl, isopropyl, n-butyl, isobutyl), or an alkaryl radical (notably $C_1$-$C_8$ alkyl, $C_6$-$C_{18}$ aryl);

Z represents a (divalent) radical selected from: a saturated or unsaturated aliphatic hydrocarbon group; a saturated, unsaturated and/or aromatic, monocyclic or polycyclic, carbocyclic group, bearing or not bearing at least one heteroatom (for example S, preferably N or O); a group having a saturated or unsaturated aliphatic hydrocarbon moiety and a carbocyclic moiety as defined above; said radical optionally being substituted or interrupted by a sulfur atom and/or, preferably, an oxygen atom and/or a nitrogen atom, said nitrogen atom bearing a monovalent group selected from a hydrogen atom, a saturated or unsaturated aliphatic hydrocarbon group, a saturated or unsaturated and/or aromatic, monocyclic or polycyclic, carbocyclic group bearing or not bearing at least one heteroatom (for example S, preferably N or O) and a group having a saturated or unsaturated aliphatic hydrocarbon moiety; in general, Z represents an alkyl chain, in particular linear or branched, notably of $C_1$-$C_{12}$ (for example methyl, ethyl, n-propyl, isopropyl, n-butyl, isobutyl), or alkylidene, optionally bearing at least one heteroatom (for example S, preferably N or O) or an aromatic moiety, notably of $C_6$-$C_{18}$, optionally bearing at least one heteroatom (for example S, preferably N or O), for example phenyl, anthracenyl, pyridinyl;

R″, which may be identical or different, each represent an alkyl radical, in particular linear, branched, cyclic or aromatic, optionally bearing at least one heteroatom (for example S, preferably N or O), generally a linear or branched alkyl radical, notably of $C_1$-$C_8$ (for example methyl, ethyl, n-propyl, isopropyl, n-butyl, isobutyl), or, preferably, a hydrogen atom H;

X, which may be identical or different, each represent a radical selected from N, CH and CR″;

$X_1$ represents a radical selected from N, $N^+$, $S^+$, CH and CR″, preferably from N, CH and CR″;

$X_2$ and $X_3$, which may be identical or different, each represent a radical selected from N, CH and CR';

A represents an alkyl radical, in particular linear or branched, notably of $C_1$-$C_8$ (for example methyl, ethyl, n-propyl, isopropyl, n-butyl, isobutyl), an aryl radical, notably of $C_6$-$C_{18}$ (for example phenyl, o-cresyl) or C=O, preferably A being different from C=O when X represents C;

B represents an alkyl radical, in particular linear or branched, notably of $C_1$-$C_8$ (for example methyl, ethyl, n-propyl, isopropyl, n-butyl, isobutyl), an aryl radical, notably of $C_6$-$C_{18}$ (for example phenyl, o-cresyl) or C=O, preferably B being different from C=O when X represents C.

Formula (VI) includes forms that are tautomeric on the double bonds.

As preferred examples of compounds of formula (VI) employed according to the invention, we may mention the following compounds of formula (VIa), (VIb), (VIc):

(VIa)

(VIb)

(VIc)

Formula (VII)

in which:

n is an integer equal to 1, 2 or 3 (n applies to (RO) and 3-n to R');

R represents a hydrogen atom H, or, preferably, an alkyl radical, in particular linear, branched, cyclic or aromatic (generally a linear or branched alkyl radical), notably of $C_1$-$C_8$ (for example methyl, ethyl, n-propyl, isopropyl, n-butyl, isobutyl), or an alkaryl radical (notably $C_1$-$C_8$ alkyl, $C_6$-$C_{18}$ aryl);

R' represents an alkyl radical, in particular linear, branched, cyclic or aromatic, optionally bearing at least one heteroatom (for example S, preferably N or O), generally a linear or branched alkyl radical, notably of $C_1$-$C_8$ (for example methyl, ethyl, n-propyl, isopropyl, n-butyl, isobutyl), or an alkaryl radical (notably $C_1$-$C_8$ alkyl, $C_6$-$C_{18}$ aryl);

Z represents a (divalent) radical selected from: a saturated or unsaturated aliphatic hydrocarbon group; a saturated, unsaturated and/or aromatic, monocyclic or polycyclic, carbocyclic group, bearing or not bearing at least one heteroatom (for example S, preferably N or O); a group having a saturated or unsaturated aliphatic hydrocarbon moiety and a carbocyclic moiety as defined above; said radical optionally being substituted or interrupted by a sulfur atom and/or, preferably, an oxygen atom and/or a nitrogen atom, said nitrogen atom bearing a monovalent group selected from a hydrogen atom, a saturated or unsaturated aliphatic hydrocarbon group, a saturated or unsaturated and/or aromatic, monocyclic or polycyclic, carbocyclic group bearing or not bearing at least one heteroatom (for example S, preferably N or O) and a group having a saturated or unsaturated aliphatic hydrocarbon moiety; in general, Z represents an alkyl chain, in particular linear or branched, notably of $C_1$-$C_{12}$ (for example methyl, ethyl, n-propyl, isopropyl, n-butyl, isobutyl), or alkylidene, optionally bearing at least one heteroatom (for example S, preferably N or O) or an aromatic moiety, notably of $C_6$-$C_{18}$/ optionally bearing at least one heteroatom (for example S, preferably N or O), for example phenyl, anthracenyl, pyridinyl;

X represents a radical selected from O, N, NH, NR", CH and CR", R" being an alkyl radical, in particular linear, branched, cyclic or aromatic, generally a linear or branched alkyl radical, notably of $C_1$-$C_8$ (for example methyl, ethyl, n-propyl, isopropyl, n-butyl, isobutyl); preferably X represents an oxygen atom O.

As a preferred example of compounds of formula (VII) employed according to the invention, we may mention the following compound of formula (VIIa):

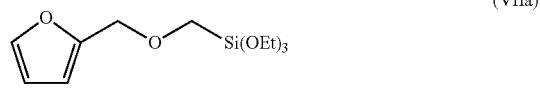

(VIIa)

The compounds of formulae (I), (II), (III), (IV), (V), (VI) and (VII) used according to the invention preferably do not possess a C=C—C=O bond.

Advantageously, the compounds of formulae (I), (II), (III), (IV), (V), (VI) and (VII) used according to the invention are not sulfur-containing compounds.

The compounds of formulae (I), (II), (III), (IV), (V), (VI) and (VII) are examples of compounds usable in the first object of the invention.

Very preferably, the compound of formula (IIIa) ((N-(3-triethoxysilylpropyl)-4,5-dihydroimidazole) is employed according to the invention.

The functionalized organosilicon compounds (silanes) employed in the invention can be prepared by known methods, having one or more synthesis steps, notably from alkoxysilane raw materials that are already functionalized and are widely available commercially, for example chloroalkylalkoxysilane, aminoalkylalkoxysilane, aminoalkylaminoalkylalkoxysilane.

For example, for the silanes of formula (I) in which radical A bears one (or more) heteroatom(s), such as N, the routes of access can notably comprise a reaction of nucleophilic substitution on a silane derivative (in particular Si—Z—Cl+ $NH_2$-(A)-CR"=XBN), a reaction of nucleophilic substitution on an olefinic derivative (in particular Si—Z—$NH_2$+Cl-(A)-CR"=XBN) or a reaction of hydrosilylation (Si—H+C=C—(Z)-A-C=XBN). The compounds of formula (I) with a vinylbenzyl function (such as the compound of formula Ia) can be prepared from aminoalkylalkoxysilane or from aminoalkylaminoalkylalkoxysilane by reaction with a compound of the vinylbenzyl chloride type (or a derivative thereof).

Certain compounds of formula (III), notably of the dihydroimidazole type (X=Y=N), such as the silane of formula (IIIa), can be obtained from aminoalkylaminoalkylalkoxysilane and from an orthoformate derivative (such as an alkyl orthoformate). Compounds of formula (IV), of the imidazolinium type, can be prepared by nucleophilic substitution of imidazole on a haloalkylsilane (Si—Z—Cl+imidazole).

Natural rubber (poly(cis-1,4-isoprene)) is an elastomer which, under the combined effect of temperature and mechanical shearing during the mixing step in the preparation of the elastomer formulation, leads to a radical mechanism of cleavage of the isoprene units constituting the chain and therefore reduction of the viscosity.

The applicant found, unexpectedly, that the coupling agents employed according to the invention, in particular those corresponding to formulae (I) to (IV), make it possible, on the one hand, not to generate additional radical reactions and/or to stabilize the radicals formed during the mixing step and, on the other hand, to be able to create a covalent bond between the inorganic filler, such as silica, and the isoprene units of the elastomer.

Advantageously, the coupling agents employed in the present invention are effective in terms of reactivity and are easy to use industrially.

In the present account, "inorganic filler" or "reinforcing inorganic filler" means an inorganic filler or mineral, regardless of its origin (natural or synthetic), also called white filler or clear filler, capable of reinforcing on its own, without other means save a coupling agent, a composition of natural and/or synthetic elastomer(s).

The reinforcing inorganic filler can be in any physical state, i.e. said filler can be for example in the form of powder, granules or microbeads.

In general, the reinforcing inorganic filler employed in the invention is formed from silica, alumina, aluminum hydroxide, aluminosilicate, titanium dioxide, carbon black covered completely or partially with silica and/or alumina, or a mixture of these species, notably of silica and alumina.

Preferably, the reinforcing inorganic filler is formed from silica.

Suitable silica that can be used in the invention notably include all precipitated or pyrogenic silicas, in particular those having a BET specific surface less than or equal to 450 $m^2/g$.

According to a preferred variant, a precipitated silica is used, which can be conventional or, advantageously, (highly) dispersible.

Highly dispersible silica means in particular any silica having a very considerable capacity for disaggregation and dispersion in a polymer matrix, notably observable by electron or light microscopy, on thin sections.

It is possible for example to use a highly dispersible silica having a CTAB specific surface less than or equal to 450 m²/g, in particular between 50 and 350 m²/q.

It is possible to use a silica according to one of the applications EP-A-0520862, WO-A-95/09127, WO-A-95/09128, WO-A-98/54090 and WO-A-03/016215.

As nonlimiting examples of dispersible silicas, we may mention the silica Perkasil KS 430 from the company Akzo, the silicas BV3380 and Ultrasil 7000 from the company Evonik, the silicas Zeosil 1165 MP and 1115 MP, HRS 1200 MP and Zeosil Premium 200 MP from the company Rhodia, the silica Hi-Sil 2000 from the company PPG, the silica Zeopol 8745 from the company Huber.

Treated precipitated silicas are also suitable, such as for example the silicas containing aluminum described in patent applications EP-A-0735088, 0762992 and 0762993.

More particularly, the precipitated silicas are very suitable that have:

a CTAB specific surface between 60 and 280 m²/g, in particular between 70 and 250 m²/g, notably between 100 and 240 m²/g, for example between 110 and 190 m²/g, a BET specific surface between 60 and 300 m²/g, in particular between 70 and 280 m²/g, notably between 100 and 250 m²/g, for example between 110 and 200 m²/g, optionally, a DOP oil uptake less than 300 ml/100 g, for example between 200 and 295 ml/100 g, and optionally, a BET specific surface/CTAB specific surface ratio between 1.0 and 1.6.

Silica also means blends of different silicas.

The CTAB specific surface is the external surface area, which can be determined according to the method NF T 45007 (November 1987). The BET specific surface can be measured according to the Brunauer-Emmett-Teller method described in "The Journal of the American Chemical Society", Vol. 60, page 309 (1938) and corresponding to standard NF T 45007 (November 1987). The DOP oil uptake can be determined according to standard ISO 787/5 using dioctyl phthalate.

As reinforcing alumina, it is possible to use a dispersible alumina having:

a BET specific surface between 30 and 400 m²/g, for example between 60 and 250 m²/g, an average particle size at most equal to 500 nm, for example at most equal to 200 nm, and a high proportion of Al—OH surface reactive functions, as described in patent application EP-A-0810258.

As nonlimiting examples of reinforcing aluminas, we may notably mention the aluminas A125, CR125, D65CR from the company Baïkowski.

The functionalized organosilicon compound used according to the present invention as coupling agent can be mixed beforehand with the inorganic filler used as reinforcing filler, notably when the latter is precipitated silica, in particular of high dispersibility. Said organosilicon compound can in fact be grafted beforehand on the reinforcing inorganic filler which will thus be "precoupled" before it is mixed with the composition of elastomer(s).

It is possible to use some or all of the functionalized organosilicon compound used according to the invention as coupling agent in supported form (application on the support being carried out prior to its use) on a solid that is compatible with the chemical structure corresponding to said functionalized organosilicon compound, and said solid support can be for example carbon black.

The elastomer compositions in which the coupling agents described above are used according to the invention can contain at least one agent for coating the inorganic filler used as reinforcing filler. This coating agent is able, in a known manner, to improve the ease of application of the elastomer compositions in the raw state. Said coating agent can consist for example of an alkylalkoxysilane (notably an alkyltriethoxysilane), a polyol, a polyether (in particular a polyethylene glycol), a polyether-amine, a primary, secondary or tertiary amine (notably a trialkanolamine), an α,ω-dihydroxylated polydimethylsiloxane or an α,ω-diamino-polydimethylsiloxane.

The elastomer compositions in which the coupling agents described above are used according to the invention can comprise at least one other inorganic filler (notably reinforcing white fillers such as precipitated silica, in particular highly dispersible)-elastomer coupling agent, preferably a sulfide or polysulfide silane.

We may mention, as examples of said coupling agent:

bis-triethoxysilylpropyl disulfide (abbreviated to TESPD) of formula:

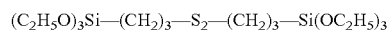

bis-triethoxysilylpropyl tetrasulfide (abbreviated to TESPT) of formula:

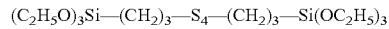

bis-monohydroxydimethylsilylpropyl tetrasulfide of formula:

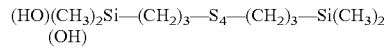

bis-monoethoxydimethylsilylpropyl disulfide (abbreviated to MESPD) of formula:

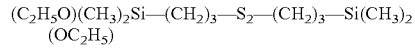

bis-monoethoxydimethylsilylpropyl tetrasulfide (abbreviated to MESPT) of formula:

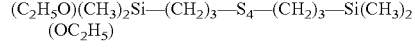

bis-monoethoxydimethylsilylisopropyl tetrasulfide (abbreviated to MESiPrT) of formula:

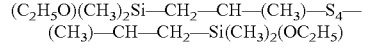

The sulfide or polysulfide silanes can be prepared according to various known methods of synthesis, described in numerous documents, for example: EP-A-0680997, EP-A-0945556, EP-A-1043357, WO-A-02/30939, WO-A-03/053983.

Sulfide or polysulfide silanes are commercially available: TESPD is for example marketed by the company Dow Corning under the designation Z-6920, by the company Evonik under the designation Si75, or by the company Momentive under the designation Silquest A1589; TESPT is for example marketed by the company Dow Corning under the designation Z-6940, by the company Evonik under the designation Si69 (or X50S when it is supported at 50 wt. % on carbon black), or by the company Momentive under the designation Silquest A1289.

The composition of elastomer(s) employed according to the invention generally comprises at least one isoprene elastomer (natural or synthetic) selected from:
(1) synthetic polyisoprenes obtained by homopolymerization of isoprene or 2-methyl-1,3-butadiene;
(2) synthetic polyisoprenes obtained by copolymerization of isoprene with one or more ethylenically unsaturated monomers selected from:
(2.1) conjugated diene monomers, other than isoprene, having from 4 to 22 carbon atoms;

(2.2) aromatic vinyl monomers having from 8 to 20 carbon atoms;

(2.3) vinyl nitrile monomers having from 3 to 12 carbon atoms;

(2.4) acrylic ester monomers derived from acrylic acid or methacrylic acid with alkanols having from 1 to 12 carbon atoms;

(2.5) a mixture of at least two of the aforementioned monomers (2.1) to (2.4); polyisoprene copolymers containing between 20 and 99 wt. % of isoprene units and between 80 and 1 wt. % of diene, aromatic vinyl, vinyl nitrile and/or acrylic ester units, and consisting for example of poly(isoprene-butadiene), poly(isoprene-styrene) and poly(isoprene-butadiene-styrene);

(3) natural rubber;

(4) copolymers obtained by copolymerization of isobutene and isoprene (butyl rubber), as well as the halogenated versions, in particular chlorinated or brominated, of these copolymers;

(5) a mixture of at least two of the aforementioned elastomers (1) to (4);

(6) a mixture containing more than 50% (preferably less than 99.5%, and for example between 70 and 99%) by weight of the aforementioned elastomer (1) or (3) and less than 50% (preferably more than 0.5%, and for example between 1 and 30%) by weight of one or more diene elastomers other than isoprene.

Diene elastomer other than isoprene means, in a manner known per se, notably: the homopolymers obtained by polymerization of one of the conjugated diene monomers defined above in point (2.1), for example polybutadiene and polychloroprene; the copolymers obtained by copolymerization of at least two of the aforementioned conjugated dienes (2.1) together or by copolymerization of one or more of the aforementioned conjugated dienes (2.1) with one or more of the aforementioned unsaturated monomers (2.2), (2.3) and/or (2.4), for example poly(butadiene-styrene) and poly(butadiene-acrylonitrile); the ternary copolymers obtained by copolymerization of ethylene, of an α-olefin having from 3 to 6 carbon atoms with an unconjugated diene monomer having from 6 to 12 carbon atoms, for example the elastomers obtained from ethylene, propylene with an unconjugated diene monomer of the aforementioned type such as notably 1,4-hexadiene, ethylidene-norbornene, dicyclopentadiene (EPDM elastomer).

The composition of elastomer(s) employed according to the invention can comprise at least one isoprene elastomer (for example natural rubber) and at least one diene elastomer other than isoprene, the amount of isoprene elastomer relative to the total amount of elastomer(s) preferably being greater than 50% (generally less than 99.5%, and for example between 70 and 99%) by weight.

Preferably, the composition of elastomer(s) comprises at least one isoprene elastomer selected from:

(1) homopolymeric synthetic polyisoprenes;

(2) copolymeric synthetic polyisoprenes consisting of poly (isoprene-butadiene), poly(isoprene-styrene) and poly(isoprene-butadiene-styrene);

(3) natural rubber;

(4) butyl rubber;

(5) a mixture of at least two of the aforementioned elastomers (1) to (4);

(6) a mixture containing more than 50% (preferably less than 99.5%, and for example between 70 and 99%) by weight of the aforementioned elastomer (1) or (3) and less than 50% (preferably more than 0.5%, and for example between 1 and 30%) by weight of diene elastomer other than isoprene consisting of polybutadiene, polychloroprene, poly(butadiene-styrene), poly(butadiene-acrylonitrile) or a terpolymer (ethylene-propylene-unconjugated diene monomer).

More preferably, the composition of elastomer(s) comprises at least one isoprene elastomer selected from: (1) homopolymeric synthetic polyisoprenes; (3) natural rubber; (5) a mixture of the aforementioned elastomers (1) and (3); (6) a mixture containing more than 50% (preferably less than 99.5%, and for example between 70 and 99%) by weight of the aforementioned elastomer (1) or (3) and less than 50% (preferably more than 0.5%, and for example between 1 and 30%) by weight of diene elastomer other than isoprene consisting of polybutadiene and poly(butadiene-styrene).

According to a very preferred variant of the invention, the composition of elastomer(s) comprises, as isoprene elastomer, at least natural rubber, or even only natural rubber.

In general, the composition of elastomer(s) employed according to the invention further comprises some or all of the other constituents and auxiliary additives usually employed in the field of elastomer compositions.

Thus, generally, it comprises at least one compound selected from curing agents (for example sulfur or a sulfur donor (such as a thiuram derivative)), vulcanization accelerators (for example a derivative of guanidine or a derivative of thiazoles), vulcanization activators (for example zinc oxide, stearic acid and zinc stearate), carbon black, protective agents (notably antioxidants and/or antiozonants, for example N-phenyl-N'-(dimethyl-1,3-butyl)-p-phenylenediamine, plasticizers.

The particular functionalized organosilicon compounds described in the foregoing, notably those corresponding to one of the formulae (I), (II), (III), (IV), (V), (VI) and (VII), can be used according to the invention more particularly in shoe soles, floor coverings, gas barriers, fireproofing materials, cableway rollers, seals of household electrical appliances, seals of pipes for liquids or gases, seals of braking systems, sheaths, cables, transmission belts or, preferably, tires, advantageously in tires for heavy goods vehicles.

The composition of elastomer(s) obtained according to the use according to the invention contains an effective amount of at least one functionalized organosilicon compound described above.

More particularly, the elastomer compositions of the invention can comprise (parts by weight), per 100 parts of isoprene elastomer(s):

10 to 200 parts, in particular 20 to 150 parts, notably 30 to 110 parts, for example 30 to 75 parts, of reinforcing inorganic filler;

1 to 20 parts, in particular 2 to 20 parts, notably 2 to 12 parts, for example 2 to 10 parts, of functionalized organosilicon compound(s) described in the foregoing used according to the invention as coupling agent(s).

Preferably, the amount of coupling agent(s), notably selected in the aforementioned ranges, is determined in such a way that it generally represents 1 to 20%, in particular 2 to 15%, for example 4 to 12%, by weight relative to the weight of the reinforcing inorganic filler.

In general, the total amounts of coupling agents (+optional coating agent) are identical to those mentioned above when using, in addition to the coupling agent used according to the invention, another coupling agent (notably sulfide or polysulfide type) and/or a coating agent.

The present invention has, as third object, the elastomer compositions described above, and therefore comprising:

at least one isoprene elastomer, at least one reinforcing inorganic filler, at least one functionalized organosilicon compound used as inorganic filler-elastomer coupling agent according to the first or second object of the invention.

Everything described above in the context of use according to the first object and the second object of the invention applies to these elastomer compositions.

The elastomer compositions according to the invention can be prepared according to any conventional procedure in two stages. A first stage (called the nonproduction stage) is a stage of thermomechanical working at high temperature. It is followed by a second stage of mechanical working (called the production stage) at temperatures generally below 110° C. in which the curing system is introduced.

The invention, considered in its third object, relates to the elastomer compositions both in the raw state (i.e. before curing) and in the cured state (i.e. after crosslinking or vulcanization).

The elastomer compositions according to the invention can be used for the manufacture of finished or semi-finished articles comprising said compositions.

The present invention thus has, as fourth object, articles comprising at least one composition of elastomer(s) as defined above, said articles consisting of shoe soles, floor coverings, gas barriers, fireproofing materials, cableway rollers, seals of household electrical appliances, seals of pipes for liquids or gases, seals of braking systems, hoses, cable sheaths, cables, engine mountings, conveyor belts, transmission belts, or, preferably, tires, advantageously tires for heavy goods vehicles.

The following examples illustrate the invention but without limiting its scope.

EXAMPLES

Examples 1-5 illustrate the preparation of functionalized organosilicon compounds (silanes) according to those used in the present invention.

Example 1

Triethoxy(4-vinylphenethyl)silane (according to formula (I))

36.1 g of trichlorosilane ($HSiCl_3$, 0.27 mol) is added in 1 hour at +40° C. to a suspension of palladium salts $PdCl_2(PPh_3)_2$ (0.5 g, 0.7 mmol) in 1,4-divinylbenzene (39 g, 0.3 mol). This suspension is kept at 40-45° C. until the reactants have been consumed completely (3 hours). 100 mL of cyclohexane and 127 g of diisopropylethylamine (0.98 mol) are added at +20° C. to this raw reaction product. Anhydrous ethanol (49.7 g, 1.08 mol) is then added slowly to this reaction mixture. The reaction temperature is maintained at +20° C. for 4 hours. The excess ethanol is evaporated under vacuum and the salts are filtered. 50 ml of water are added to this organic solution. The phases are separated, the organic phase is dried over magnesium sulfate and the solvent is evaporated under vacuum. The desired product (44.1 g) is then isolated.

Example 2

3-(N-styrylmethyl-2-aminoethylamino)propyltriethoxysilane (according to formula (I))

14 g (0.1 mol) of 4-vinylbenzyl chloride is added with stirring and at +20° C. under nitrogen atmosphere to a solution of N-(2-aminoethyl)-3-aminopropyltriethoxysilane (26.4 g, 0.1 mol) in methanol (40 g). The temperature of the mixture is raised to reflux and maintained until the reactants have been consumed completely (3 hours). After the temperature of the reaction mixture has returned to +20° C., the methanol is evaporated and the residue is taken up in 50 mL of toluene. The salts are filtered. 15 g of potassium carbonate is added to the filtrate to neutralize the residual ammonium hydrochloride. After stirring at +20° C. for 1 hour, the salts are filtered and the solvent is evaporated under vacuum. 26.4 g of the desired product are then isolated.

Example 3

N-(3-triethoxysilylpropyl)-4,5-dihydroimidazole (according to formula (IIIa))

53.2 g of ethyl orthoformate (0.36 mol) is added at +20° C. to 80 g of N-(2-aminoethyl)-3-aminopropyltriethoxysilane (0.3 mol). The temperature of the mixture is brought up to reflux until formation of ethanol is no longer observed. The reaction mixture is then distilled under partial vacuum (2-5 mbar) and the desired product (69.1 g) is recovered (temperature: 130-135° C.)

Example 4

1-(3-(triethoxysilyl)propyl)-1H-pyrrole (according to formula (VIc))

A solution of butyllithium (1.6 M in hexane, 187 mL, 0.3 mol) is added in 1 hour to a solution of pyrrole (20 g, 0.3 mol) in THF (200 ml) cooled to −10° C. This solution is kept at 0° C. for 1 hour. 72.3 g of 3-chloropropyltriethoxysilane (0.3 mol) is added to this solution, then the temperature of the reaction mixture is raised to +65° C. for 8 hours. After the temperature of the reaction mixture has returned to 20° C., the THF is evaporated under vacuum. The raw product is taken up in cyclohexane (150 mL), the salts of lithium chloride are filtered and the aqueous solution is washed with 50 mL of distilled water. The organic phase is dried over magnesium sulfate and the solvent is evaporated under vacuum. The desired product (57.8 g) is then recovered.

Example 5

3-cyclopentadienylpropyl)triethoxysilane (according to formula (VIa))

55 g (1.8 mol) of sodium hydride (NaH) is added in fractions with stirring and at −10° C., under nitrogen atmosphere, to freshly depolymerized cyclopentadiene (120 mL, 1.44 mol) in anhydrous THF (150 mL). After keeping the temperature of the reaction mixture at −10° C. for 2 hours, the excess NaH is decanted and the solution of sodium cyclopentadienide is transferred in 2 hours to a solution of triethoxychloropropylsilane (313.1 g, 1.3 mol) in THF (500 mL). The temperature of the reaction mixture must not exceed +30° C. After the reactants have been consumed (temperature of the reaction mixture: +20° C.), the sodium chloride is filtered, the THF is evaporated under vacuum and the raw reaction mixture is distilled under vacuum (pressure: 500 mbar). The desired product (186.2 g) is isolated (temperature: +50-60° C.)

Example 6

This example illustrates the use and behavior as coupling agent (inorganic filler-elastomer (natural rubber)) of the functionalized organosilicon compound N-(3-triethoxysilylpropyl)-4,5-dihydroimidazole (compound of formula (IIIa), use according to the invention).

Constitution of the Elastomer Compositions

Elastomer compositions whose constitution, expressed in parts by weight per 100 parts of elastomers (phe), is shown in Table I below, are prepared in an internal mixer of the Brabender type.

TABLE I

Formulations used for the mixtures

| Compositions | Reference R | Composition I |
|---|---|---|
| NR (1) | 100 | 100 |
| Silica (2) | 50 | 50 |
| Silane 1 (3) | 4.0 | — |
| Silane 2 (4) | — | 4.1 |
| ZnO - 80% | 5 | 5 |
| Stearic acid | 2 | 2 |
| Antioxidant (5) | 1.5 | 1.5 |
| Antioxidant (6) | 1.0 | 1.0 |
| CBS-80% (7) | 3.13 | 3.13 |
| Sulfur - 80% | 1.88 | 1.88 |

(1) Natural rubber SMR - CV60 (supplied by the company Safic-Alcan)
(2) Silica Z1165MP from the company Rhodia
(3) TESPT (A-1289 from the company OSi-Witco).
(4) N-(3-triethoxysilylpropyl)-4,5-dihydroimidazole
(5) N-1,3-dimethylbutyl-N-phenyl-para-phenylenediamine (Santoflex 6-PPD from the company Flexsys)
(6) 2,2,4-trimethyl-1H-quinoline (Permanax TQ from the company Flexsys)
(7) N-cyclohexyl-2-benzothiazyl-sulfenamide (Rhenogran CBS-80 from the company Bayer).

The silanes are used as coupling agents at an isomolar proportion of silicon, i.e. the same number of moles of functions "N" is used (here "N"=$Si(OC_2H_5)_3$) that are reactive with respect to silica and its surface hydroxyl groups.

Method of Preparation of the Elastomer Compositions

The method of preparation of the compositions is carried out in two successive stages of preparation. A first stage consists of a stage of thermomechanical working at high temperature. It is followed by a second stage of mechanical working at temperatures below 110° C.; this stage allows introduction of the curing system.

The first stage is carried out in an internal mixer of the Brabender type (capacity 70 mL). The filling factor is 0.75. The initial temperature and the speed of the rotors are fixed each time so as to reach mixture falling temperatures close to 130-180° C.

It makes it possible to incorporate the elastomer (natural rubber), then the reinforcing inorganic filler consisting of the silica (fractional introduction) with some or all of the silane(s), then the various vulcanization activators (stearic acid, zinc oxide) and the protective agent (6-PPD). The duration of this stage is between 3 and 10 minutes.

After the mixture has cooled (temperature below 100° C.), the curing system (sulfur and accelerator CBS) can be introduced in the second stage. This is performed on a roller mixer, preheated to 50° C. The duration of this stage is between 2 and 6 minutes.

Each final mixture is then calendered in the form of plates with a thickness of 2-3 mm.

On these so-called raw mixtures obtained, evaluation of their rheological properties makes it possible to optimize the vulcanization time and temperature.

Then, the mechanical and dynamic properties of the mixtures vulcanized in optimal conditions are measured.

Rheological Properties

The measurements are performed on the compositions in the raw state. Table II shows the results relating to rheology testing, carried out at 150° C. using an MDR rheometer, Monsanto MDR 2000 E, according to standard DIN 53529.

According to this test, the composition to be tested is placed in the test chamber regulated to a temperature of 150° C. for 30 minutes, and the resisting torque, opposed by the composition, is measured at low-amplitude oscillation)(0.5°) of a two-cone rotor included in the test chamber, the composition completely filling said chamber.

The following are determined from the curve of the variation of torque as a function of time:

minimum torque (S'min);
maximum torque (S'max);
delta-torque ($\Delta S'$=S'max−S'min);
time T98 required to obtain a state of vulcanization corresponding to 98% of complete vulcanization (this time is taken as optimum vulcanization);
scorch time TS2 corresponding to the time required to have an increase of 2 points above the minimum torque at the temperature considered (150° C.) and reflecting the time during which it is possible to use the raw mixtures at this temperature without having initiation of vulcanization (the mixture hardens starting from TS2).

The results obtained are given in Table II.

TABLE II

| Compositions | Reference R | Composition I |
|---|---|---|
| S'min (dN · m) | 1.32 | 2.28 |
| S'max (dN · m) | 15.5 | 17.43 |
| Delta torque (dN · m) | 14.18 | 15.15 |
| TS2 (min) | 10.68 | 6.06 |
| T98 (min) | 18.89 | 13.3 |

Mechanical Properties of the Vulcanizates

The measurements are performed on compositions with optimum vulcanization (T98) for a temperature of 150° C.

The tests in uniaxial tension are performed in accordance with standard NF T 46-002 with test specimens of type H2 at a speed of 500 mm/min on an Instron 5564 tester. The modulus values x % correspond to the stress measured at x % strain in tension. It is possible to determine a reinforcement index (R.I.), which is equal to the ratio of the modulus at 300% strain to the modulus at 100% strain.

Shore hardness A of the vulcanizates is measured in accordance with standard ASTM D 2240. The value given is measured at 15 seconds.

The measured properties are summarized in Table III.

TABLE III

| Compositions | Reference R | Composition I |
|---|---|---|
| Modulus 10% (Mpa) | 0.87 | 0.83 |
| Modulus 100% (Mpa) | 3.2 | 2.98 |
| Modulus 300% (Mpa) | 14.36 | 17.22 |
| Breaking strength (Mpa) | 28.7 | 30.3 |
| R.I. | 4.49 | 5.78 |
| Shore Hardness A (points) | 59 | 58 |

Dynamic Properties of the Vulcanizates

The dynamic properties are measured on a viscoanalyzer (Metravib VA3000), according to standard ASTM D5992.

The values of loss factor (tan δ) and of complex modulus in dynamic compression (E*) are recorded on vulcanized samples (cylindrical test specimen of section 95 mm² and height 14 mm). The sample is submitted at the start to a prestrain of 10%, then to a sinusoidal strain in alternating compression of +/−2%. The measurements are performed at 60° C. and at a frequency of 10 Hz.

The results, presented in Table IV, are the complex modulus in compression (E*-60° C.-10 Hz) and loss factor (tan δ-60° C.-10 Hz).

The values of the loss factor (tan δ) and amplitude of elastic modulus in dynamic shear (ΔG') are recorded on vulcanized samples (parallelepiped test specimen of section 8 mm² and height 7 mm). The sample is submitted to a sinusoidal strain in alternating double shear at a temperature of 40° C. and at a frequency of 10 Hz. The process of strain amplitude scanning is carried out according to a forward-return cycle, in the range from 0.1 to 100% then return from 100 to 0.1%.

The results, presented in Table IV, are from the strain amplitude scanning on return and relate to the maximum value of the loss factor (tan δ max return-40° C.-10 Hz) as well as the amplitude of the elastic modulus (ΔG'-40° C.-10 Hz) between the values at 0.1% and 50% strain (Payne effect).

TABLE IV

| Compositions | Reference R | Composition I |
|---|---|---|
| E* - 60° C. - 10 Hz (MPa) | 6.70 | 5.99 |
| Tan δ - 60° C. - 10 Hz | 0.073 | 0.053 |
| Tan δ max return - 40° C. - 10 Hz | 0.117 | 0.116 |
| ΔG' - 40° C. - 10 Hz (MPa) | 1.41 | 1.66 |

It can be seen, from reading the results in tables II to IV, that the composition of the invention (composition I) offers a very good compromise of properties, notably a better compromise for reinforcement at large strains/ultimate tensile properties/hysteresis properties at 60° C. relative to the reference composition (reference R).

The invention claimed is:

1. A method of incorporating an inorganic filler-elastomer coupling agent into a composition of elastomer(s), the method comprising:
   incorporating the inorganic filler-elastomer coupling agent into the composition of elastomer(s) wherein the inorganic filler-elastomer coupling agent comprises at least one functionalized organosilicon compound, wherein the at least one functionalized organosilicon compound corresponds to one of the following formulae: (I), (II), (III), (IV), (V), (VI) and (VII):

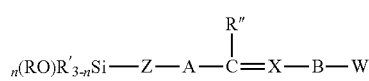

(I)

where, in said formula (I):
n is an integer equal to 1, 2 or 3;
R represents a hydrogen atom H, or an alkyl radical or an alkaryl radical;
R' represents an alkyl radical, optionally bearing at least one heteroatom, or an alkaryl radical;
Z represents a radical selected from the group consisting of: a saturated or unsaturated aliphatic hydrocarbon group; a saturated, unsaturated and/or aromatic, monocyclic or polycyclic, carbocyclic group bearing or not bearing at least one heteroatom; a group having a saturated or unsaturated aliphatic hydrocarbon moiety and a carbocyclic moiety as defined above; said radical optionally being substituted or interrupted by a sulfur atom and/or, optionally, an oxygen atom and/or a nitrogen atom, said nitrogen atom bearing a monovalent group selected from the group consisting of a hydrogen atom, a saturated or unsaturated aliphatic hydrocarbon group, a saturated or unsaturated and/or aromatic, monocyclic or polycyclic, carbocyclic group bearing or not bearing at least one heteroatom and a group having a saturated or unsaturated aliphatic hydrocarbon moiety;
R" represents an alkyl radical, optionally bearing at least one heteroatom, or, preferably, a hydrogen atom H;
X represents a radical selected from N, CH and CR";
A represents an alkyl or alkaryl radical, optionally bearing at least one heteroatom;
B represents a hydrogen atom or an alkyl or alkaryl radical, optionally bearing at least one heteroatom, B optionally being identical to A;
the radical —W is optional or contains the formula —Z—SiR'$_{3-n}$(OR)$_n$;

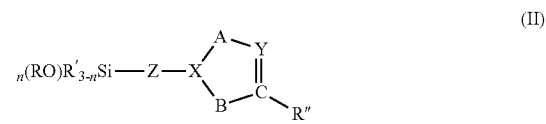

(II)

where, in said formula (II):
n is an integer equal to 1, 2 or 3;
R represents a hydrogen atom H, an alkyl radical or an alkaryl radical;
R' represents an alkyl radical, optionally bearing at least one heteroatom, or an alkaryl radical;
Z represents a radical selected from the group consisting of: a saturated or unsaturated aliphatic hydrocarbon group; a saturated, unsaturated and/or aromatic, monocyclic or polycyclic, carbocyclic group bearing or not bearing at least one heteroatom; a group having a saturated or unsaturated aliphatic hydrocarbon moiety and a carbocyclic moiety as defined above; said radical optionally being substituted or interrupted by a sulfur atom and/or, optionally, an oxygen atom and/or a nitrogen atom, said nitrogen atom bearing a monovalent group selected from the group consisting of a hydrogen atom, a saturated or unsaturated aliphatic hydrocarbon group, a saturated or unsaturated and/or aromatic, monocyclic or polycyclic, carbocyclic group bearing or not bearing at least one heteroatom and a group having a saturated or unsaturated aliphatic hydrocarbon moiety;
R" represents an alkyl radical, optionally bearing at least one heteroatom, or, preferably, a hydrogen atom H;
X represents a radical selected from N, N⁺, CH and CR", and the bond X-B can be C=C or N=C;
Y represents a radical selected from N, CH and CR";
A and B, which are different or identical, each represent an alkyl radical, an alkylene radical or C=O, A and B each being different from C=O when Y=C;

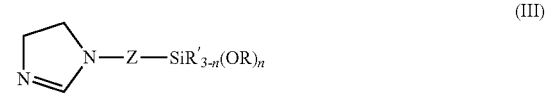

(III)

in which:
n is an integer equal to 1, 2 or 3;

R represents a hydrogen atom H, an alkyl radical or an alkaryl radical;
R' represents an alkyl radical, optionally bearing at least one heteroatom, or an alkaryl radical;
Z represents a radical selected from the group consisting of: a saturated or unsaturated aliphatic hydrocarbon group; a saturated, unsaturated and/or aromatic, monocyclic or polycyclic, carbocyclic group bearing or not bearing at least one heteroatom; a group having a saturated or unsaturated aliphatic hydrocarbon moiety and a carbocyclic moiety as defined above; said radical optionally being substituted or interrupted by a sulfur atom and/or, optionally, an oxygen atom and/or a nitrogen atom, said nitrogen atom bearing a monovalent group selected from the group consisting of a hydrogen atom, a saturated or unsaturated aliphatic hydrocarbon group, a saturated or unsaturated and/or aromatic, monocyclic or polycyclic, carbocyclic group bearing or not bearing at least one heteroatom and a group having a saturated or unsaturated aliphatic hydrocarbon moiety;

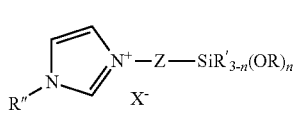

(IV)

in which:
n is an integer equal to 1, 2 or 3;
R represents a hydrogen atom H, an alkyl radical or an alkaryl radical;
R' represents an alkyl radical, optionally bearing at least one heteroatom, or an alkaryl radical;
Z represents a radical selected from the group consisting of: a saturated or unsaturated aliphatic hydrocarbon group; a saturated, unsaturated and/or aromatic, monocyclic or polycyclic, carbocyclic group bearing or not bearing at least one heteroatom; a group having a saturated or unsaturated aliphatic hydrocarbon moiety and a carbocyclic moiety as defined above; said radical optionally being substituted or interrupted by a sulfur atom and/or, optionally, an oxygen atom and/or a nitrogen atom, said nitrogen atom bearing a monovalent group selected from the group consisting of a hydrogen atom, a saturated or unsaturated aliphatic hydrocarbon group, a saturated or unsaturated and/or aromatic, monocyclic or polycyclic, carbocyclic group bearing or not bearing at least one heteroatom and a group having a saturated or unsaturated aliphatic hydrocarbon moiety;
R" represents an alkyl radical or a hydrogen atom H;
X is a halogen atom, optionally Cl;

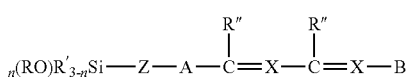

(V)

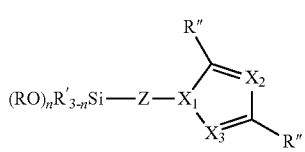

(VI)

where, in said formulae (V) and (VI):
n is an integer equal to 1, 2 or 3;

R represents a hydrogen atom H, an alkyl radical or an alkaryl radical;
R' represents an alkyl radical, optionally bearing at least one heteroatom, or an alkaryl radical;
Z represents a radical selected from the group consisting of: a saturated or unsaturated aliphatic hydrocarbon group; a saturated, unsaturated and/or aromatic, monocyclic or polycyclic, carbocyclic group bearing or not bearing at least one heteroatom; a group having a saturated or unsaturated aliphatic hydrocarbon moiety and a carbocyclic moiety as defined above; said radical optionally being substituted or interrupted by a sulfur atom and/or, optionally, an oxygen atom and/or a nitrogen atom, said nitrogen atom bearing a monovalent group selected from the group consisting of a hydrogen atom, a saturated or unsaturated aliphatic hydrocarbon group, a saturated or unsaturated and/or aromatic, monocyclic or polycyclic, carbocyclic group bearing or not bearing at least one heteroatom and a group having a saturated or unsaturated aliphatic hydrocarbon moiety;
R", which are identical or different, each represent an alkyl radical, optionally bearing at least one heteroatom, or, optionally, a hydrogen atom H;
X, which are identical or different, each represent a radical selected from the group consisting of N, CH and CR";
$X_1$ represents a radical selected from the group consisting of N, $N^+$, $S^+$, CH and CR";
$X_2$ and $X_3$, which are identical or different, each represent a radical selected from the group consisting of N, CH and CR';
A represents an alkyl radical, an aryl radical or C=O;
B represents an alkyl radical, an aryl radical or C=O;

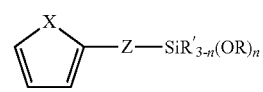

(VII)

in which:
n is an integer equal to 1, 2 or 3;
R represents a hydrogen atom H, an alkyl radical or an alkaryl radical;
R' represents an alkyl radical, optionally bearing at least one heteroatom, or an alkaryl radical;
Z represents a radical selected from the group consisting of: a saturated or unsaturated aliphatic hydrocarbon group; a saturated, unsaturated and/or aromatic, monocyclic or polycyclic, carbocyclic group bearing or not bearing at least one heteroatom; a group having a saturated or unsaturated aliphatic hydrocarbon moiety and a carbocyclic moiety as defined above; said radical optionally being substituted or interrupted by a sulfur atom and/or, optionally, an oxygen atom and/or a nitrogen atom, said nitrogen atom bearing a monovalent group selected from the group consisting of a hydrogen atom, a saturated or unsaturated aliphatic hydrocarbon group, a saturated or unsaturated and/or aromatic, monocyclic or polycyclic, carbocyclic group bearing or not bearing at least one heteroatom and a group having a saturated or unsaturated aliphatic hydrocarbon moiety;
X represents a radical selected from the group consisting of O, N, NH, NR", CH and CR", R" being an alkyl radical,
at least one isoprene elastomer, and
at least one inorganic filler as reinforcing filler.

2. The method as claimed in claim 1, wherein the at least one functionalized organosilicon compound corresponds to one of the following formulae (Ia), (Ib), (Ic) and (Id):

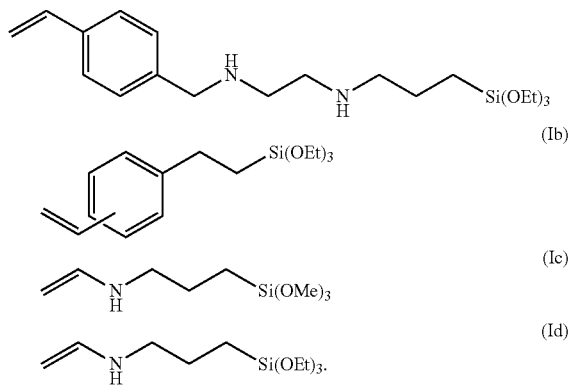

3. The method as claimed in claim 1, wherein the at least one functionalized organosilicon compound corresponds to one of the following formulae (IIIa) and (IVa):

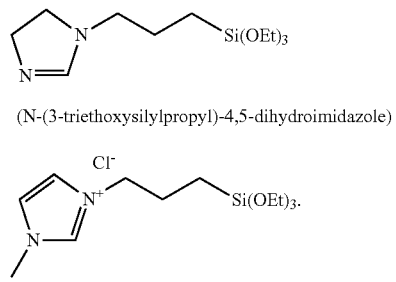

4. The method as claimed in claim 1, wherein the at least one functionalized organosilicon compound corresponds to one of the following formulae (VIa), (VIb), (VIc) and (VIIa):

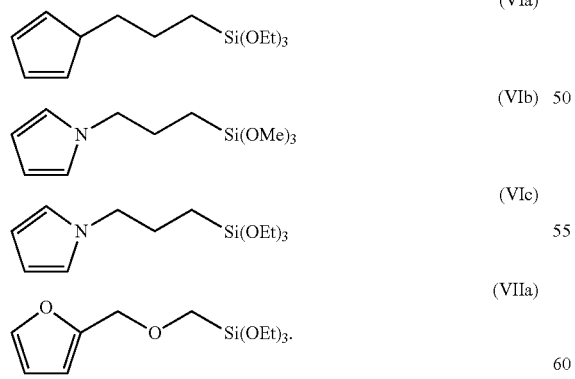

5. The method as claimed in claim 1, wherein the inorganic filler used as reinforcing filler is silica.

6. The method as claimed in claim 1, wherein the at least one functionalized organosilicon compound is mixed beforehand with the inorganic filler used as reinforcing filler.

7. The method as claimed in claim 1, wherein the composition of elastomer(s) further comprises at least one agent for coating the inorganic filler used as reinforcing filler.

8. The method as claimed in claim 1, wherein the composition of elastomer(s) further comprises at least one other inorganic filler-elastomer coupling agent.

9. The method as claimed in claim 1, wherein said composition of elastomer(s) comprises at least one isoprene elastomer and at least one diene elastomer other than isoprene.

10. The method as claimed in claim 1, wherein the composition of elastomer(s) comprises at least one isoprene elastomer selected from the group consisting of:
   (1) synthetic polyisoprenes obtained by homopolymerization of isoprene or 2-methyl-1,3-butadiene;
   (2) synthetic polyisoprenes obtained by copolymerization of isoprene with one or more ethylenically unsaturated monomers selected from the group consisting of:
      (2.1) conjugated diene monomers, other than isoprene, having from 4 to 22 carbon atoms;
      (2.2) aromatic vinyl monomers having from 8 to 20 carbon atoms;
      (2.3) vinyl nitrile monomers having from 3 to 12 carbon atoms;
      (2.4) acrylic ester monomers derived from acrylic acid or methacrylic acid with alkanols having from 1 to 12 carbon atoms; and
      (2.5) a mixture of at least two of the aforementioned monomers (2.1) to (2.4);
   polyisoprene copolymers comprising between 20 and 99 wt. % of isoprene units and between 80 and 1 wt. % of diene, aromatic vinyl, vinyl nitrile and/or acrylic ester units, and optionally comprising poly(isoprene-butadiene), poly(isoprene-styrene) and poly(isoprene-butadiene-styrene);
   (3) natural rubber;
   (4) copolymers obtained by copolymerization of isobutene and isoprene, as well as halogenated versions of these copolymers;
   (5) a mixture of at least two of the aforementioned elastomers (1) to (4); and
   (6) a mixture containing more than 50 wt. % of the aforementioned elastomer (1) or (3) and less than 50 wt. % of one or more diene elastomers other than isoprene.

11. The method as claimed in claim 10, wherein the composition of elastomer(s) comprises at least one isoprene elastomer selected from the group consisting of:
   (1) homopolymeric synthetic polyisoprenes;
   (2) copolymeric synthetic polyisoprenes consisting of poly(isoprene-butadiene), poly(isoprene-styrene) and poly(isoprene-butadiene-styrene);
   (3) natural rubber;
   (4) butyl rubber;
   (5) a mixture of at least two of the aforementioned elastomers (1) to (4); and
   (6) a mixture comprising more than 50 wt. % of the aforementioned elastomer (1) or (3) and less than 50 wt. % of diene elastomer other than isoprene comprising polybutadiene, polychloroprene, poly(butadiene-styrene), poly(butadiene-acrylonitrile) or a terpolymer.

12. The method as claimed in claim 1, wherein the composition of elastomer(s) comprises at least natural rubber as isoprene elastomer.

13. The method as claimed in claim 1, wherein the composition of elastomer(s) further comprises at least one compound selected from the group consisting of curing agents, vulcanization accelerators, vulcanization activators, carbon black, protective agents, and plasticizers.

14. A composition of elastomer(s), the composition comprising:
   at least one isoprene elastomer,
   at least one reinforcing inorganic filler, and
   at least one functionalized organosilicon compound as an inorganic filler-elastomer coupling agent,
   wherein the at least one functionalized organosilicon compound corresponds to one of the following formulas: (I), (II), (III), (IV), (V), (VI) and (VII):

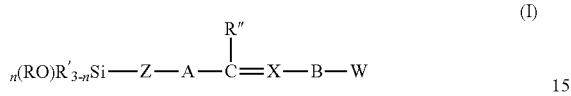

(I)

where, in said formula (I):
n is an integer equal to 1, 2 or 3;
R represents a hydrogen atom H, or an alkyl radical or an alkaryl radical;
R' represents an alkyl radical, optionally bearing at least one heteroatom, or an alkaryl radical;
Z represents a radical selected from the group consisting of: a saturated or unsaturated aliphatic hydrocarbon group; a saturated, unsaturated and/or aromatic, monocyclic or polycyclic, carbocyclic group bearing or not bearing at least one heteroatom; a group having a saturated or unsaturated aliphatic hydrocarbon moiety and a carbocyclic moiety as defined above; said radical optionally being substituted or interrupted by a sulfur atom and/or, optionally, an oxygen atom and/or a nitrogen atom, said nitrogen atom bearing a monovalent group selected from the group consisting of a hydrogen atom, a saturated or unsaturated aliphatic hydrocarbon group, a saturated or unsaturated and/or aromatic, monocyclic or polycyclic, carbocyclic group bearing or not bearing at least one heteroatom and a group having a saturated or unsaturated aliphatic hydrocarbon moiety;
R" represents an alkyl radical, optionally bearing at least one heteroatom, or, preferably, a hydrogen atom H;
X represents a radical selected from N, CH and CR";
A represents an alkyl or alkaryl radical, optionally bearing at least one heteroatom;
B represents a hydrogen atom or an alkyl or alkaryl radical, optionally bearing at least one heteroatom, B optionally being identical to A;
the radical —W is optional or contains the formula —Z—SiR'$_{3-n}$(OR)$_n$;

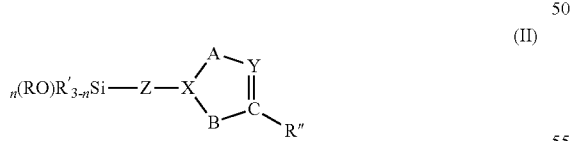

(II)

where, in said formula (II):
n is an integer equal to 1, 2 or 3;
R represents a hydrogen atom H, an alkyl radical or an alkaryl radical;
R' represents an alkyl radical, optionally bearing at least one heteroatom, or an alkaryl radical;
Z represents a radical selected from the group consisting of: a saturated or unsaturated aliphatic hydrocarbon group; a saturated, unsaturated and/or aromatic, monocyclic or polycyclic, carbocyclic group bearing or not bearing at least one heteroatom; a group having a saturated or unsaturated aliphatic hydrocarbon moiety and a carbocyclic moiety as defined above; said radical optionally being substituted or interrupted by a sulfur atom and/or, optionally, an oxygen atom and/or a nitrogen atom, said nitrogen atom bearing a monovalent group selected from the group consisting of a hydrogen atom, a saturated or unsaturated aliphatic hydrocarbon group, a saturated or unsaturated and/or aromatic, monocyclic or polycyclic, carbocyclic group bearing or not bearing at least one heteroatom and a group having a saturated or unsaturated aliphatic hydrocarbon moiety;
R" represents an alkyl radical, optionally bearing at least one heteroatom, or, preferably, a hydrogen atom H;
X represents a radical selected from N, N$^+$, CH and CR", and the bond X-B can be C=C or N=C;
Y represents a radical selected from N, CH and CR";
A and B, which are different or identical, each represent an alkyl radical, an alkylene radical or C=O, A and B each being different from C=O when Y=C;

(III)

in which:
n is an integer equal to 1, 2 or 3;
R represents a hydrogen atom H, an alkyl radical or an alkaryl radical;
R' represents an alkyl radical, optionally bearing at least one heteroatom, or an alkaryl radical;
Z represents a radical selected from the group consisting of: a saturated or unsaturated aliphatic hydrocarbon group; a saturated, unsaturated and/or aromatic, monocyclic or polycyclic, carbocyclic group bearing or not bearing at least one heteroatom; a group having a saturated or unsaturated aliphatic hydrocarbon moiety and a carbocyclic moiety as defined above; said radical optionally being substituted or interrupted by a sulfur atom and/or, optionally, an oxygen atom and/or a nitrogen atom, said nitrogen atom bearing a monovalent group selected from the group consisting of a hydrogen atom, a saturated or unsaturated aliphatic hydrocarbon group, a saturated or unsaturated and/or aromatic, monocyclic or polycyclic, carbocyclic group bearing or not bearing at least one heteroatom and a group having a saturated or unsaturated aliphatic hydrocarbon moiety;

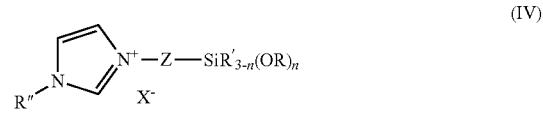

(IV)

in which:
n is an integer equal to 1, 2 or 3;
R represents a hydrogen atom H, an alkyl radical or an alkaryl radical;
R' represents an alkyl radical, optionally bearing at least one heteroatom, or an alkaryl radical;
Z represents a radical selected from the group consisting of: a saturated or unsaturated aliphatic hydrocarbon group; a saturated, unsaturated and/or aromatic, monocyclic or polycyclic, carbocyclic group bearing or not bearing at least one heteroatom; a group having a saturated or unsaturated aliphatic hydrocarbon moiety and a carbocyclic moiety as defined above; said radical optionally being substituted or interrupted by a sulfur atom and/or, optionally, an oxygen atom and/or a nitrogen atom, said nitrogen atom bearing a monovalent group selected from the group consisting of a hydrogen atom, a saturated or unsaturated aliphatic hydrocarbon group, a saturated or unsaturated and/or aromatic, monocyclic or polycyclic, carbocyclic group bearing or not bearing at least one heteroatom and a group having a saturated or unsaturated aliphatic hydrocarbon moiety;

R" represents an alkyl radical or a hydrogen atom H;

X is a halogen atom, optionally Cl;

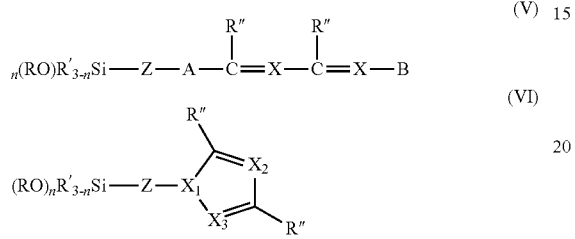

where, in said formulae (V) and (VI):

n is an integer equal to 1, 2 or 3;

R represents a hydrogen atom H, an alkyl radical or an alkaryl radical;

R' represents an alkyl radical, optionally bearing at least one heteroatom, or an alkaryl radical;

Z represents a radical selected from the group consisting of: a saturated or unsaturated aliphatic hydrocarbon group; a saturated, unsaturated and/or aromatic, monocyclic or polycyclic, carbocyclic group bearing or not bearing at least one heteroatom; a group having a saturated or unsaturated aliphatic hydrocarbon moiety and a carbocyclic moiety as defined above; said radical optionally being substituted or interrupted by a sulfur atom and/or, optionally, an oxygen atom and/or a nitrogen atom, said nitrogen atom bearing a monovalent group selected from the group consisting of a hydrogen atom, a saturated or unsaturated aliphatic hydrocarbon group, a saturated or unsaturated and/or aromatic, monocyclic or polycyclic, carbocyclic group bearing or not bearing at least one heteroatom and a group having a saturated or unsaturated aliphatic hydrocarbon moiety;

R", which are identical or different, each represent an alkyl radical, optionally bearing at least one heteroatom, or, optionally, a hydrogen atom H;

X, which are identical or different, each represent a radical selected from the group consisting of N, CH and CR";

$X_1$ represents a radical selected from the group consisting of N, N$^+$, S$^+$, CH and CR";

$X_2$ and $X_3$ which are identical or different each represent a radical selected from the group consisting of N, CH and CR';

A represents an alkyl radical, an aryl radical or C=O;

B represents an alkyl radical, an aryl radical or C=O;

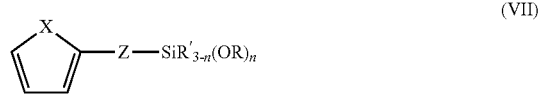

in which:

n is an integer equal to 1, 2 or 3;

R represents a hydrogen atom H, an alkyl radical or an alkaryl radical;

R' represents an alkyl radical, optionally bearing at least one heteroatom, or an alkaryl radical;

Z represents a radical selected from the group consisting of: a saturated or unsaturated aliphatic hydrocarbon group; a saturated, unsaturated and/or aromatic, monocyclic or polycyclic, carbocyclic group bearing or not bearing at least one heteroatom; a group having a saturated or unsaturated aliphatic hydrocarbon moiety and a carbocyclic moiety as defined above; said radical optionally being substituted or interrupted by a sulfur atom and/or, optionally, an oxygen atom and/or a nitrogen atom, said nitrogen atom bearing a monovalent group selected from the group consisting of a hydrogen atom, a saturated or unsaturated aliphatic hydrocarbon group, a saturated or unsaturated and/or aromatic, monocyclic or polycyclic, carbocyclic group bearing or not bearing at least one heteroatom and a group having a saturated or unsaturated aliphatic hydrocarbon moiety;

X represents a radical selected from the group consisting of O, N, NH, NR", CH and CR", R" being an alkyl radical.

15. The composition as claimed in claim 14, wherein the reinforcing inorganic filler is silica.

16. The composition as claimed in claim 14, wherein the composition further comprises at least one agent for coating the reinforcing inorganic filler.

17. The composition as claimed in claim 14, wherein the composition further comprises at least one other inorganic filler-elastomer coupling agent.

18. The composition as claimed in claim 14, wherein the composition of elastomer(s) further comprises at least one diene elastomer other than isoprene.

19. The composition as claimed in claim 14, wherein the isoprene elastomer(s) is/are selected from the group consisting of:
(1) synthetic polyisoprenes obtained by homopolymerization of isoprene or 2-methyl-1,3-butadiene;
(2) synthetic polyisoprenes obtained by copolymerization of isoprene with one or more ethylenically unsaturated monomers selected from the group consisting of:
(2.1) conjugated diene monomers, other than isoprene, having from 4 to 22 carbon atoms;
(2.2) aromatic vinyl monomers having from 8 to 20 carbon atoms;
(2.3) vinyl nitrile monomers having from 3 to 12 carbon atoms;
(2.4) acrylic ester monomers derived from acrylic acid or methacrylic acid with alkanols having from 1 to 12 carbon atoms; and
(2.5) a mixture of at least two of the aforementioned monomers (2.1) to (2.4);
polyisoprene copolymers comprising between 20 and 99 wt. % of isoprene units and between 80 and 1 wt. % of diene, aromatic vinyl, vinyl nitrile and/or acrylic ester units, and optionally comprising poly(isoprene-butadiene), poly(isoprene-styrene) and poly(isoprene-butadiene-styrene);
(3) natural rubber;
(4) copolymers obtained by copolymerization of isobutene and of isoprene, as well as halogenated versions of these copolymers;
(5) a mixture of at least two of the aforementioned elastomers (1) to (4); and
(6) a mixture comprising more than 50 wt. % of the aforementioned elastomer (1) or (3) and less than 50 wt. % of one or more diene elastomers other than isoprene.

20. The composition as claimed in claim 19, wherein the isoprene elastomer(s) is/are selected from the group consisting of:
(1) homopolymeric synthetic polyisoprenes;
(2) copolymeric synthetic polyisoprenes comprising of poly(isoprene-butadiene), poly(isoprene-styrene) and poly(isoprene-butadiene-styrene);

(3) natural rubber;
(4) butyl rubber;
(5) a mixture of at least two of the aforementioned elastomers (1) to (4); and
(6) a mixture comprising more than 50 wt. % of the aforementioned elastomer (1) or (3) and less than 50 wt. % of diene elastomer other than isoprene comprised of polybutadiene, polychloroprene, poly(butadiene-styrene), poly(butadiene-acrylonitrile) or a terpolymer.

21. The composition as claimed in claim 14, wherein the composition of elastomer(s) comprises at least natural rubber as isoprene elastomer.

22. The composition as claimed in claim 14, wherein the composition of elastomer(s) further comprises at least one compound selected from the group consisting of curing agents, vulcanization accelerators, vulcanization activators, carbon black, protective agents, and plasticizers.

23. An article comprising at least one composition as claimed in claim 14, wherein said article is selected from the group consisting of a shoe sole, a floor covering, a gas barrier, a fireproofing material, a cableway roller, a seal of household electrical appliances, a seal of pipes for liquids or gases, a seal of a braking system, a hose, a cable sheath, a cable, an engine mounting, a conveyor belt, a transmission belt, and a tire.

24. The tire as claimed in claim 23, wherein the tire is designed for heavy goods vehicles.

25. The method as claimed in claim 1, wherein $X_1$ represents a radical selected from the group consisting of N, CH and CR".

26. The method as claimed in claim 1, wherein A is different from C=O when X represents C.

27. The method as claimed in claim 1, wherein B is different from C=O when X represents C.

28. The method as claimed in claim 1, wherein X is an oxygen atom O.

29. The method as claimed in claim 5, wherein the inorganic filler is a precipitated silica.

30. The method as claimed in claim 8, wherein the at least one other inorganic filler-elastomer coupling agent is a sulfide or a polysulfide silane.

31. The method as claimed in claim 9, wherein the isoprene elastomer is present in an amount that is greater than 50 wt. % relative to the total amount of elastomer(s).

32. The method as claimed in claim 10, wherein when the at least one isoprene elastomer is a conjugated diene monomer, other than isoprene, having from 4 to 22 carbon atoms, the conjugated diene monomer is selected from the group consisting of 1,3-butadiene, 2,3-dimethyl-1,3-butadiene, 2-chloro-1,3-butadiene (or chloroprene), 1-phenyl-1,3-butadiene, 1,3-pentadiene, and 2,4-hexadiene.

33. The method as claimed in claim 9, wherein when the at least one isoprene elastomer is an aromatic vinyl monomer having 8 to 20 carbon atoms, the aromatic vinyl monomer is selected from the group consisting of styrene, orthomethylstyrene, metamethylstyrene, paramethylstyrene, a commerial mixture "vinyl-toluene," para-tert butylstyrene, methoxystyrene, chlorostyrene, vinylmesitylene, divinylbenzene and vinylnaphthalene.

34. The method as claimed in claim 9, wherein when the at least one isoprene elastomer is vinyl nitrile monomer having from 3 to 12 carbon atoms, the vinyl nitrile monomer is acrylonitrile or methacrylonitrile.

35. The method as claimed in claim 9, wherein when the at least one isoprene elastomer is an acrylic ester monomer derived from acrylic acid or methacrylic acid with alkanols having from 1 to 12 carbon atoms, the acrylic ester monomer is selected from the group consisting of methyl acrylate, ethyl acrylate, propyl acrylate, n-butyl acrylate, isobutyl acrylate, ethyl-2-hexyl acrylate, methyl methacrylate, ethyl methacrylate, n-butyl methacrylate, and isobutyl methacrylate.

36. The composition as claimed in claim 15, wherein the reinforcing inorganic filler is a precipitated silica.

37. The composition as claimed in claim 17, wherein the at least one other inorganic filler-elastomer coupling agent is a sulfide or polysulfide silane.

38. The composition as claimed in claim 18, wherein the isoprene elastomer is present in an amount greater than 50 wt. % relative to the total amount of elastomer(s).

39. The method as claimed in claim 1, wherein the at least one functionalized organosilicon compound corresponds to formula (I) therein.

40. The method as claimed in claim 1, wherein the at least one functionalized organosilicon compound corresponds to formula (II) therein.

41. The method as claimed in claim 1, wherein the at least one functionalized organosilicon compound corresponds to formula (III) therein.

42. The method as claimed in claim 1, wherein the at least one functionalized organosilicon compound corresponds to formula (IV) therein.

43. The method as claimed in claim 1, wherein the at least one functionalized organosilicon compound corresponds to formula (V) or (VI) therein.

44. The method as claimed in claim 1, wherein the at least one functionalized organosilicon compound corresponds to formula (VII) therein.

* * * * *